A. J. POCOCK.
DRIVING MEANS ESPECIALLY ADAPTED FOR LIQUID MEASURING PUMPS.
APPLICATION FILED AUG. 4, 1915.

1,178,456.

Patented Apr. 4, 1916.
3 SHEETS—SHEET 1.

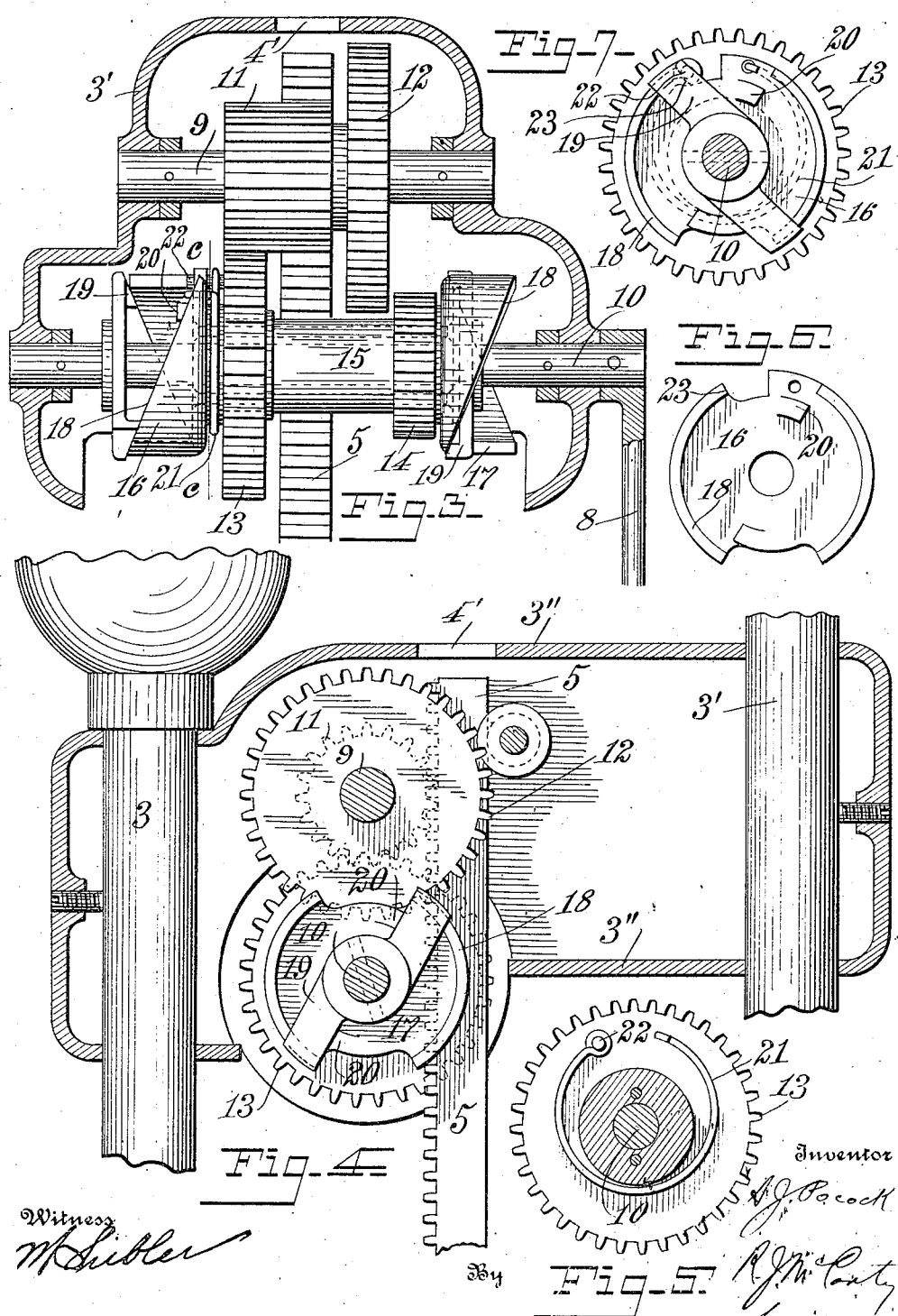

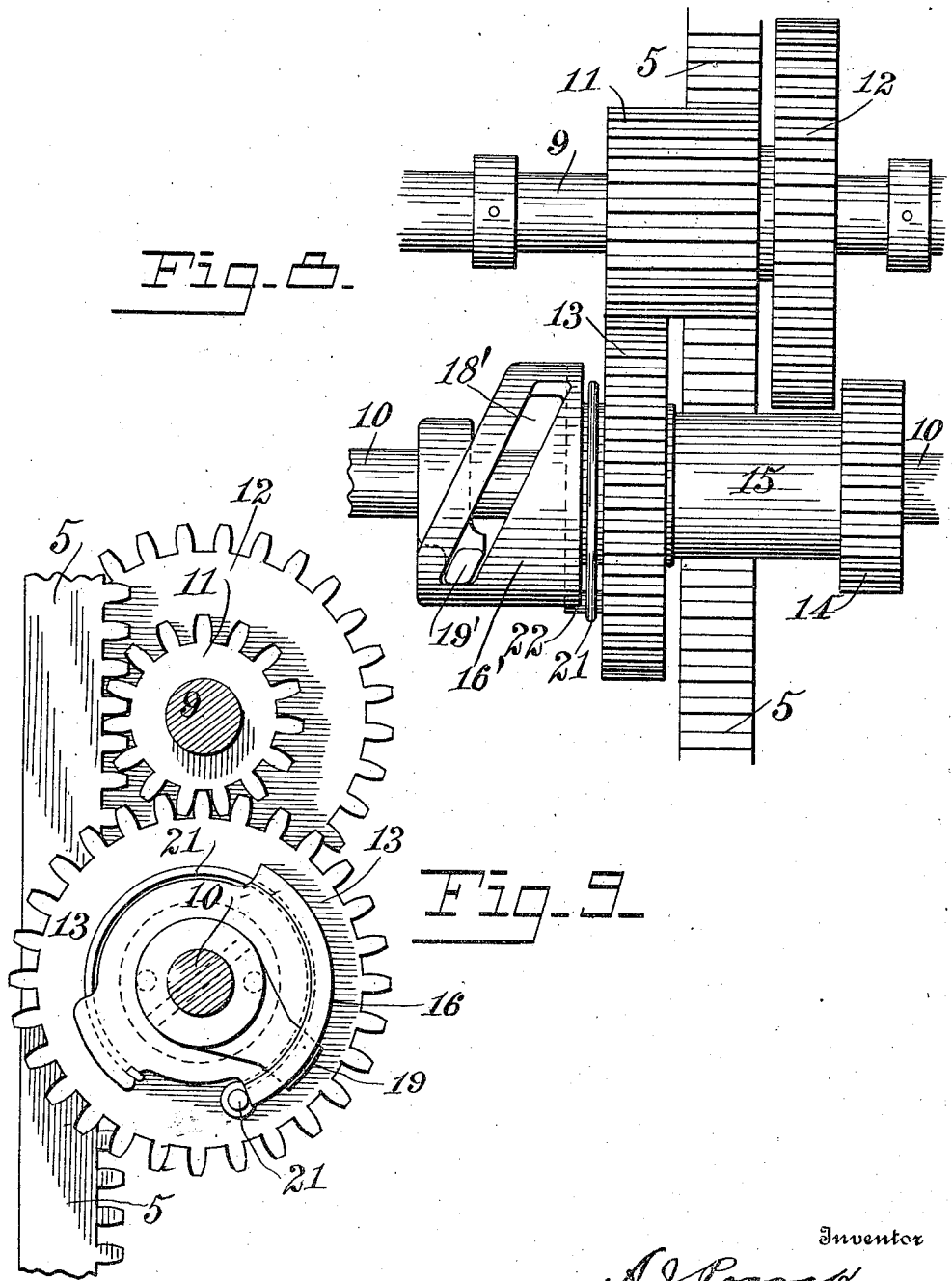

UNITED STATES PATENT OFFICE.

AUGUSTINE J. POCOCK, OF DAYTON, OHIO.

DRIVING MEANS ESPECIALLY ADAPTED FOR LIQUID-MEASURING PUMPS.

1,178,456.  Specification of Letters Patent.  Patented Apr. 4, 1916.

Application filed August 4, 1915. Serial No. 43,590.

*To all whom it may concern:*

Be it known that I, AUGUSTINE J. POCOCK, a citizen of the United States, residing at Dayton, in the county of Montgomery and State of Ohio, have invented certain new and useful Improvements in Driving Means Especially Adapted for Liquid-Measuring Pumps; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain improvements in driving means especially adapted for liquid measuring pumps of a single-acting single cylinder type.

The object and purpose of the invention is to provide a simplified and positive system of reversing and change-speed gears whereby the idle stroke of the piston is accelerated and time is gained in the operation of the pump as well as accuracy.

A further object of the invention is to provide means for insuring a positive and accurate intermeshing of the gears at all times when changing from one drive to the other, as will hereinafter more fully appear from the following specification in connection with the accompanying drawings, of which—

Figure 1:
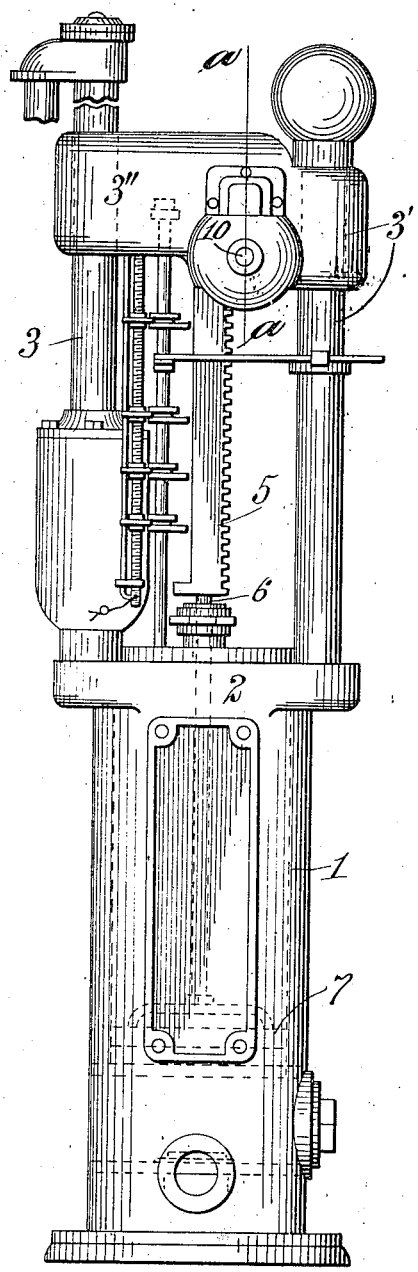
Figure 2:
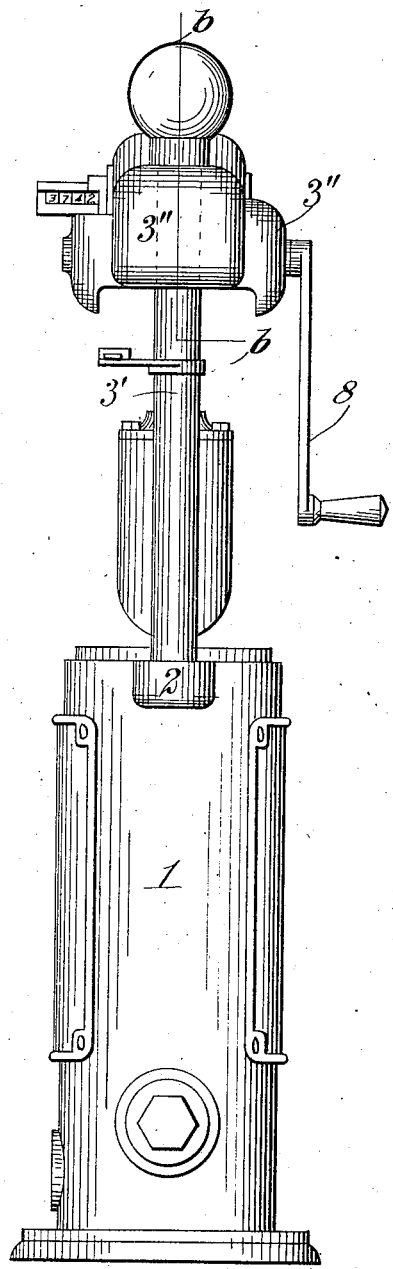

Figures 1 and 2 are vertical elevations of a liquid measuring pump having my improvements applied thereto. Fig. 3 is an enlarged sectional elevation through the gear box showing the arrangement of the driving gears and associated parts. Fig. 4 is a sectional elevation through the gear box at right angles to Fig. 3. Fig. 5 is a detail sectional view of one of the change speed gears. Fig. 6 is a detail view of the cam that occupies a position adjacent to the gear shown in Fig. 5. Fig. 7 is a section on the line *c—c* of Fig. 3, and Figs. 8 and 9 are elevations of modifications of the gear shifting device.

In a detail description of the invention, similar reference characters indicate corresponding parts.

The pump comprises a single cylinder 1 having a chambered head 2 into which the liquid is discharged by the piston 7 on the upstroke thereof and from which chambered head the said liquid is discharged into a discharging pipe 3 and thence from the pump in a well known manner. Extending from the said chambered head is a pipe 3' which supports a chambered head 3'' at the top thereof. The gearing is inclosed in a box suitably mounted on said pipes. As stated, within this gear box is housed the driving gears through which the piston is reciprocated from the movement of a crank-handle 8 fixed to a lower shaft 10. Suitably connected with the piston rod 6 is a toothed bar or rack 5 which extends up into the housing 4 and through an opening 4' in the top of said housing when the piston is elevated within the cylinder. Primary driving gear wheels 11 and 12 are mounted in the upper portion of the gear box on shaft 9 which has suitable bearings in the sides thereof. The pinion or gear wheel 11 is in constant mesh with the rack 5 and from this gear wheel the piston is directly driven, the movement being reversed, as presently described. Adjacent to the gear wheel 11 on the same shaft is the gear wheel 12, before referred to. The gear wheels 11 and 12 are suitably fixed to each other and to the shaft 9. The rack is driven in one direction by the gear wheel 12 through its connection with gear wheel 11 and in the other direction by gear wheel 11 direct. With the main drive gear wheel 11 a secondary driving gear wheel 13 is adapted to mesh and through which downward movement is imparted to the rack 5 from said gear wheel 11. A pinion 14 constitutes a secondary driving gear adapted to mesh with gear wheel 12 and through which the up-movement is imparted to the rack 5. The pinion 14 is fixed to a sleeve 15 and the gear wheel 13 is journaled on said sleeve which sleeve in turn is journaled on a counter shaft 10 having proper bearings in the lower portion of the gear box. The pinion 14 and the sleeve 15 have a fixed relation with two double-faced cams 16 and 17 which are also fixed to the sleeve 15. The parts 15, 14, 16 and 17 may be designated as the fixed parts. The cams 16 and 17 have opposing inclined working surfaces 18 which are in coöperative relation with dogs 19 fixed to shaft 10 and arranged to ride against the inclined surfaces 18 and thus impart a slidable movement to the fixed parts and the gear wheel 13 said wheel being loosely mounted upon the sleeve 15, one of said fixed parts. The dogs 19 are pinned or otherwise rigidly secured to the counter shaft 10 and the latter shaft is rotated through the crank-handle 8, as before indicated. As stated, the slidable movement is imparted to the fixed parts constituting the pinion 14, sleeve 15, and cams 16 and 17. This slidable movement is also imparted to the gear wheel 13 which, as before stated, is loosely mounted on the sleeve 15. By such movement of said fixed parts the pinion 14 and the gear wheel 13 are alternately caused to mesh and unmesh with the respective primary driving gear wheels 11 and 12. At opposite points of the faces of the cams 16 and 17 driving abutments 20 are arranged adjacent to the lower points of the inclined surfaces 18 of the cams and with which the projecting ends of the dogs 19 engage at the end of the slidable movement of the fixed parts on shaft 10 and thereby the gears on the counter shaft 10 are rotated alternately to drive the rack through the respective gear wheels 11 and 12.

Referring particularly to the cam 17 on the right, as shown in Fig. 3, when the dog 19 assembled therewith is rotated by moving the crank-handle 8 it slides up the inclined surfaces of said cam and thereby the entire fixed parts including the cams, pinion 14, sleeve 15, and the loose gear wheel 13, are slid until the teeth of the pinion 14 come in contact with the teeth of the gear 12. In the event that the teeth of the pinion 14 should jam or fail to mesh with the teeth of the gear wheel 12 and thereby create a resistance to the travel of the dog 19 up the incline of the cam 17, the slidable movement of the fixed parts will be arrested or the parts become locked against such movement with the result that said fixed parts will be caused to rotate and will slide over the side or ends of the teeth of the gear wheel 12 until the teeth of said pinion 14 arrive at the point where they can mesh with those of the gear wheel 12. For example, at such time the pinion 14 continues to slide in its contact with the gear wheel 12 until it is in a proper position and the dog 19 has traversed the inclines of the cam and has come in contact with the abutments 20 thereof. This causes the fixed parts on the counter shaft 10 to revolve, thereby imparting to the piston of the pump an upward movement from the pinion 14 which meshes with the gear wheel 12. The sliding movement of the teeth of the pinion 14 over the ends of the teeth of the gear wheel 12 produces some lost motion of the fixed parts on the counter shaft 10 and the loose gear wheel 13, and this is liable to occur only in the event the pinion 14 and gear 12 should fail to readily mesh when the pinion 14 is slid thereto. The lost motion referred to will take place when the main drive gear wheel 11 is at rest, for example, at the limit of a stroke of the piston, and the secondary drive gear wheel 13 is in mesh with said gear wheel 11 by reason of the said gear wheel 13 being journaled on the fixed parts and the rotation of said fixed parts independently of said gear wheel 13. This lost motion allows the teeth of the pinion 14 to revolve into position for meshing with the gear wheel 12, the only resistance to said movement of the pinion 14 being a spring 21. This spring 21 is connected at one end to the gear wheel 13 by means of a stud 22 and at the other end the said spring is connected to the cam 16, which, as before stated, is one of the fixed parts. The stud 22 is in a position to engage a shoulder 23 on the cam 16 and the said stud so constitutes a fixed driving connection between said cam 16 and the gear wheel 13, acting only as such when engaged by the shoulder 23 under the action of the spring 21. During this movement of the gear wheel 13, the piston, through the rack 5, is driven downwardly. If in the reverse slidable movement of the pinion 14 the teeth thereof engage the ends of the teeth of the gear wheel 12 instead of meshing therewith, the fixed parts, to-wit, the pinion 14, sleeve 15 and cams 16 and 17, will revolve, while the gear 12 remains stationary thereby contracting the spring 21 and taking up the lost motion by causing the shoulder 23 on the cam 16 to travel away from the pin 22. This lost motion, it will be understood, allows the teeth of the pinion 14 to travel into a meshing position with the teeth of the gear wheel 12 without turning the gear wheel 13. As the gear wheel 13 slides out of mesh with the main driving gear wheel 11, the said spring reacts and thereby brings the shoulder 23 in contact with the pin 22, which is the initial position of the reverse driving position. By this arrangement the gears are enabled to be reversed and to properly intermesh without interruption or obstruction in the operation of the pump. It will be apparent that one double-acting cam may be employed to reciprocate the fixed parts on the shaft 10 instead of two cams as shown with the same result and that in lieu of one of said cams, for example, that associated with the spring 21, any suitable member may be employed to coöperate with the stud 22 to furnish the means for rotating the gear wheel 13 through the stud. These are obvious expedients which are so simple as not to require any further description or any illustration thereof.

Having described my invention, I claim.

1. In a driving mechanism for liquid measuring pumps, the combination with a rack connected with the piston of such pump, of primary driving gear wheels one of which is in constant mesh with said rack and the other of which is connected with the primary driving gear wheel so in constant mesh with said rack, secondary driving gear wheels adapted to alternately intermesh with said primary gear wheels to impart reverse motion to said rack, a sleeve slidably mounted and to which one of said secondary driving gear wheels is fixed and upon which the other of said secondary driving gear wheels is journaled, means for reciprocating said sleeve and therewith the gear wheels so mounted thereon to effect an alternate engaging and disengaging of said secondary gear wheels with their respective primary gear wheels, means providing for lost rotary motion of said sleeve and the gear wheel fixed thereto in the event said fixed gear wheel should fail to mesh with its companion gear wheel, substantially as specified.

2. In a driving gear for liquid measuring pumps, the combination with a rack connected with the piston of said pump, of primary driving gears one of which is in constant mesh with said rack and the other of which is connected with said constantly meshed gear, secondary driving gears adapted to alternately drive said primary gears, a shiftable sleeve to which one of said secondary gears is fixed and upon which the other of said secondary gears is journaled, cams fixed to said sleeve, said sleeve and cams and the gear fixed thereto being adapted to receive lost rotary movement in the event that the said fixed gear fails to readily intermesh with its companion gear when shifted, shifting members fixed to the shaft upon which said sleeve is journaled and engaging said cams to shift said sleeve and the secondary gears to mesh and unmesh with their companion primary gears and to alternately rotate said gears, a spring attached to the gear journaled on said sleeve and to one of said cams, a stud rotated by said shaft and forming a driving connection for the gear wheel journaled on said sleeve, the spring being adapted to effect a connection between said gear and said stud when the gear fixed to said sleeve is caused to intermesh with its companion gear at the end of said lost motion, substantially as specified.

3. In a gearing of the type specified, the combination with a rack, of the primary driving gears 11 and 12 fixed one to the other and one of which is in permanent mesh with said rack and imparts to said rack a reciprocatory movement, secondary driving gears 13 and 14 adapted to mesh and unmesh with the gears 11 and 12, a shiftable sleeve 15 to which the gear 14 is fixed and upon which the gear 13 is journaled, cams 16 and 17 fixed to said sleeve 15, actuating members 19 fixed to the shaft upon which said sleeve is journaled and engaging said cams to impart slidable movement to the gears 13 and 14 to alternately mesh gear 14 with gear 12 and gear 13 with gear 11, said gear 14 being adapted to receive some lost rotary movement in the event it does not readily intermesh with the gear 12 when shifted thereto, a spring 21 connected to the gear 13 and adapted to be contracted during the period of said lost motion, and a stud 22 forming a driving connection between the gear 13 and the shaft upon which said sleeve is journaled, said spring being adapted to restore the operative connection between the gear 13 and its driving stud 22 at the end of the period of said lost motion, substantially as specified.

In testimony whereof I affix my signature.

AUGUSTINE J. POCOCK.